United States Patent [19]

Runyon et al.

[11] Patent Number: 4,511,707

[45] Date of Patent: Apr. 16, 1985

[54] WATER-SOLUBLE PRECONDENSATES USEFUL FOR IMPROVING THE FASTNESS OF DYES AND OPTICAL BRIGHTENERS ON HYDROXY GROUP-CONTAINING SUBSTRATES

[75] Inventors: James R. Runyon, Oberwil; Salvatore Valenti, Binningen, both of Switzerland

[73] Assignee: Sandoz Ltd., Basel, Switzerland

[21] Appl. No.: 573,647

[22] Filed: Jan. 25, 1984

Related U.S. Application Data

[62] Division of Ser. No. 376,901, May 10, 1982, Pat. No. 4,439,203.

[51] Int. Cl.$^3$ .................... C08G 12/10; D06M 15/54; C08G 59/10
[52] U.S. Cl. ........................ 528/250; 8/496; 8/556; 524/195; 525/509; 528/263; 528/266; 528/268
[58] Field of Search ............... 525/509; 528/250, 263, 528/266, 268

[56] References Cited

U.S. PATENT DOCUMENTS

| | | | |
|---|---|---|---|
| 2,649,354 | 8/1953 | Hemmi et al. | 8/551 |
| 4,410,652 | 10/1983 | Robinson et al. | 8/551 |
| 4,417,898 | 11/1983 | Hasler et al. | 8/543 |
| 4,439,203 | 3/1984 | Runyon et al. | 8/496 |
| 4,439,208 | 3/1984 | Moser et al. | 8/556 |

*Primary Examiner*—A. Lionel Clingman
*Attorney, Agent, or Firm*—Gerald D. Sharkin; Richard E. Vila; Thomas C. Doyle

[57] ABSTRACT

The wet fastness properties of direct or reactive dyeings on cellulosic substrates are improved by aftertreatment with a precondensate of (A) the product of reacting a mono- or polyfunctional primary or secondary amine with cyanamide, dicyandiamide (DCDA), guanidine or biguanidine; or ammonia with cyanamide or DCDA; whereby up to 50 mole % of the cyanamide, DCDA, guanidine or biguanide may be replaced with a dicarboxylic acid or a mono- or di-ester thereof, said product (A) containing reactive hydrogen atoms bound to nitrogen, and either (B) an epihalohydrin or a precursor thereof, or
(C) formaldehyde or a formaldehyde precursor, or
(D) a dihydroxyalkyleneurea or a methyl ether thereof, followed by formaldehyde or a formaldehyde precursor optionally together with (E) an N-methylol derivative of a urea, melamine, guanamine, triazinone, urone, carbamate or acid amide and, if (A) is used with (C) or (D), or if (E) is present, together with (F) a catalyst for the cross-linking of N-methylol compounds of the type (E) above, and subsequently carrying out a cross-linking step.

20 Claims, No Drawings

WATER-SOLUBLE PRECONDENSATES USEFUL FOR IMPROVING THE FASTNESS OF DYES AND OPTICAL BRIGHTENERS ON HYDROXY GROUP-CONTAINING SUBSTRATES

This is a division of application Ser. No. 376,901, filed May 10, 1982, now U.S. Pat. No. 4,439,203.

This invention relates to an aftertreatment process for improving the fastness properties of dyes and optical brighteners on a hydroxy group-containing substrate.

The invention provides a process for improving the fastness properties of a dyestuff or optical brightener on a substrate comprising hydroxy group-containing fibres by applying to the dyed, printed or brightened substrate a precondensate of (A) the product of reacting a mono- or polyfunctional primary or secondary amine with cyanamide, dicyandiamide (DCDA), guanidine or biguanidine; or ammonia with cyanamide or DCDA; with the proviso that up to 50 mole % of the cyanamide, DCDA, guanidine or biguanidine may be replaced with a dicarboxylic acid or a mono- or di-ester thereof, said product (A) containing reactive hydrogen atoms bound to nitrogen, and either (B) an epihalohydrin or a precursor thereof or (C) formaldehyde or a formaldehyde precursor or (D) a dihydroxyalkyleneurea or a methyl ether thereof, followed by formaldehyde or a formaldehyde precursor optionally together with (E) an N-methylol derivative of a urea, melamine, guanamine, triazinone, urone, carbamate or acid amide and, if (A) is used with (C) or (D), or if (E) is present, together with (F) a catalyst for the cross-linking of N-methylol compounds of the type (E) above, and subsequently carrying out a cross-linking step.

In the process of the invention, the presence of N-methylol compound (E), which imparts an additional crease-resistant finish, is optional, but the presence of catalyst (F) is essential except in the case where a precondensate of components (A) and (B) is used in the absence of (E).

By 'precondensate' is meant a reaction product which remains water-soluble and non-gelled, and is capable of further cross-linking.

The invention further provides an aftertreatment agent for a dyed, printed or brightened substrate comprising hydroxy group-containing fibres, which agent comprises a precondensate of component (A) with components (B), (C) or (D), together with catalyst (F) and, optionally, component (E). The catalyst is preferably added to the already formed precondensate, or alternatively in some cases the condensation reaction may be carried out in the presence of the catalyst.

Where an N-methylol compound (E) is present, this, together with catalyst (F), may be mixed with the already-formed precondensate of (A) with (B), (C) or (D), or alternatively a mixture of (A), (B, C or D) and (E) may be reacted together, and catalyst (F) added either before, during or after the reaction. The reaction product of (A) with (B or C) and (E), also forms part of the present invention.

For use with compounds (B) and (C), component (A) is preferably the reaction product of a polyalkylenepolyamine with cyanamide, dicyandiamide (DCDA) or guanidine, more preferably with DCDA. The polyamine is preferably of formula I $$RRN-(Z-X)_{n}Z-NRR \quad \text{I}$$

in which each R independently is hydrogen or a $C_{1-10}$ alkyl group unsubstituted or monosubstituted with hydroxy, $C_{1-4}$alkoxy or cyano, n is a number from 0 to 100

Z, or each Z independently when n>0, is $C_{2-4}$alkylene or hydroxyalkylene and X, or each X independently when n>1, is —O—, —S— or —NR— where R is as defined above, provided that the amine of formula I contains at least one reactive —NH— or —NH$_2$ group.

More preferably each R is hydrogen, n is 0 to 4, X is NH or —NCH$_3$— and Z, or each Z independently when n>0, is $C_{2-4}$alkylene. Particularly preferred compounds are diethylene triamine, triethylene tetramine, tetraethylene pentamine, 2-aminoethyl-3-aminopropylamine, dipropylene triamine and N,N-bis-(3-aminopropyl)methylamine.

For use with component (D) the same class of preferred components (A) may be used, but a further class are the reaction products of cyanamide, DCDA or guanidine, preferably DCDA, with an amine of formula II $$RRNH \quad \text{II}$$

in which R is as defined above.

Components A are known, and may be prepared by the methods described for example in British Pat. No. 657 753, U.S. Pat. Nos. 2,649,354 and 4,410,652 and British published application No. 2 070 006A. Suitably the amine, in free base or salt form, is reacted with the other starting material in the absence of water at elevated temperatures optionally in the presence of a non-aqueous solvent. Preferably the reaction is carried out in the absence of solvent at a temperature of 140°-160° C., and for most combinations of reagents, ammonia is evolved. The reagents are preferably reacted in a molar ratio of 0.1 to 1 mole of cyanamide, DCDA, guanidine or bisguanidine per mole of reactive —NH or —NH$_2$ groups, and when DCDA is reacted with a polyalkylene polyamine, the molar ratio of the reactants is more preferably from 2:1 to 1:2, particularly about 1:1.

The products (A) are near-colourless viscous liquids or solids which are basic in character, water-soluble either in the free base or salt form, and contain reactive hydrogen atoms bonded to nitrogen.

Up to 50% mole, preferably up to 20% mole of the DCDA or other reagent to be reacted with the amine may be replaced by a dicarboxylic acid or a mono- or di-ester thereof. Suitable acids include adipic acid, oxalic acid and terephthalic acid, for example in the form of their dimethyl esters.

The reaction of component (A) with an epihalohydrin or a precursor thereof (B) is preferably carried out in an aqueous solution or dispersion at a temperature from room temperature to 100° C., preferably 40°-80° C. Preferred reagents are epichlorohydrin and dichlorohydrin, ClCH$_2$.CHOH.CH$_2$Cl, more preferably epichlorohydrin. The molar ratio of component (A) to epihalohydrin is preferably 1:0.3-2 more preferably 1:0.5-1.5, based on the number of moles of DCDA or analogous compound in A. The reaction should not be allowed to proceed to the stage at which gel formation begins. Preferably the initial pH of the reaction mixture is adjusted to between 6 and 9 by addition of acid; the reaction product of A & B under these pH conditions is novel and forms part of the present invention.

The reaction of component (A) with formaldehyde or a precursor thereof (e.g. paraformaldehyde) (C) is preferably carried out in an aqueous medium at a temperature from 20°–60° C., preferably 40°–50° C. and at a pH>4, preferably between 7 and 11. The formaldehyde may be added in the form of a concentrated (e.g. 37%) aqueous solution. Preferred mole ratios of compound A to formaldehyde are in the range 1:2–1:6, based on the number of moles of amine originally present. The reaction of component (A) with a dihydroxyalkyleneurea, followed by formaldehyde (D), is also suitably carried out in aqueous medium, for example by adding a concentrated aqueous solution of dihydroxyalkyleneurea to an aqueous solution of component (A) at a temperature between room temperature and 80° C., preferably at 60°–75° C. The preferred reagent is dihydroxyethyleneurea or its methyl ether.

Reaction of this intermediate product with formaldehyde is carried out under acid conditions, and it may be advantageous to acidify the reaction mixture even before carrying out the reaction of (A) with the hydroxyalkylene urea compound.

The proportions by weight of component (A) to dihydroxyalkyleneurea (DH) and formaldehyde (FM) are preferably in the range 5–40 parts (A), 25–110 parts DH, 1–60 parts FM, corresponding to a weight ratio in the range A:DH:FM = 1:0.625–22:0.025–12. Preferred proportions are 10–20 parts (A), 20–25 parts DH, 5–30 parts FM, or A:DH:FM = 1:1–2.5:0.25–3. All these are calculated on the basis of the dry weight of active component.

It is found that a more stable product is obtained if from 1% to 10% (by weight based on the total of (A)+(D) of cyanamide or dicyandiamide (DCDA), preferably DCDA, is added to the reaction mixture, preferably before reaction takes place.

Suitable catalysts (F) include the nitrates, sulphates, chlorides, tetrafluoroborates and dihydrogen orthophosphates of aluminium, magnesium and zinc as well as aluminium hydroxychloride, zirconyl oxychloride and mixtures of any of these. These catalysts may also be used in the form of mixtures with water soluble, inorganic salts, particularly with alkali metal sulphates or alkaline earth salts, preferably chlorides. Particularly preferred are sodium or potassium sulphate and calcium chloride. They may also be used in the form of mixtures with organic acids such as citric acid. Other suitable catalysts are (a) alkali metal bisulphites (b) amine hydrochlorides, for example 2-amino-2-methylpropanol hydrochloride (c) organic acids, for example citric, oxalic, maleic, glycollic and trichloracetic acids (d) inorganic acids, for example phosphoric acid hydrochloric acids, alone or together with salts for example ammonium or calcium chloride, and (e) ammonium salts of inorganic acids, for example ammonium nitrate, chloride, sulphate and oxalate, and mono- and di-ammonium orthophosphate.

Mixtures of any of these catalysts may be used.

Preferred catalysts are the nitrates, sulphates, chlorides and dihydrogen orthophosphates of aluminium, magnesium or zinc, more preferably of magnesium, particularly magnesium chloride, optionally together with an alkali metal sulphate, particularly sodium sulphate.

Where an N-methylol compound (E) is present, suitable compounds are generally those N-methylol compounds which are known as cross-linking agents for cellulose fibres, and are used to impart a crease-resistant finish to cellulose fabrics. The compounds may contain free N-methylol groups >N—CH$_2$OH, or these may be etherified. Preferred ether derivatives are the lower alkyl ethers having 1 to 4 carbon atoms in the alkyl groups.

Examples of suitable N-methylol compounds are N-N'-dimethylolurea, N,N'-dimethylolurea dimethyl ether, N,N'-tetramethylolacetylenediurea, N,N'-dimethylolpropyleneurea, 4,5-dihydroxy-N,N'-dimethylolethyleneurea, 4,5-dihydroxy-N,N'-dimethylolethyleneurea dimethyl ether, N,N'-dimethylol-5-hydroxypropyleneurea, N,N'-dimethylol-4-methoxy-5,5-dimethylpropyleneurea, N,N'-dimethylolethyleneurea, methoxymethylmelamine, dimethylolalkandioldiurethanes, N,N'-dimethylol-5-alkylhexahydro-1,3,5-triazin-2-ones, N,N'-dimethylolurone and dimethylolcarbamates. These compounds can be used either alone or as mixtures.

Particularly suitable are hydrolysis-resistant reactive resin precursors, for example N,N'-dimethylol-4,5-dihydroxy- or 4,5-dimethoxy-ethyleneurea, N,N'-dimethylol-4-methoxy-5,5-dimethylpropyleneurea and N,N'-dimethylol carbamates, optionally in etherified form. Preferred ether forms are the methyl and ethyl ether derivatives.

The N-methylol compound (E), when present, may be added to an aftertreatment agent comprising a precondensate of (A) with (B), (C) or (D) and catalyst (F). Although the precondensate of (A) with epihalohydrin (B) may be used as an aftertreatment agent without catalyst, the presence of catalyst becomes necessary if N-methylol compound (E) is added. Alternatively, particularly with components (B) and (C), the N-methylol compound (E) may be added to the mixture of (A) with (B) or (C) before reaction takes place. In this case it is preferred that catalyst (F) is also present in the reaction mixture. A common precondensate of (A), (B) and (E) or (A), (C) and (E) is thereby formed. The conditions for the reaction when (E) is present are the same as are used in the absence of (E).

The quantity of (E) which may be used is preferably from 0–500% of the weight of ((A)+(B), (C) or (D)), more preferably it is either 0 or is 50–200% of this weight. When (E) is present, the amount of catalyst (F) which is used is generally about 7.5–12.5% by weight of the dry weight of (E).

The hydroxy group-containing substrate is preferably a cellulosic fibrous substrate comprising natural or regenerated cellulose, particularly cotton and viscose rayon, alone or mixed with synthetic fibres. The substrate may be dyed, printed or brightened by any conventional methods, for example dyeing or brightening may be carried out by exhaust methods or by padding followed by thermofixation or cold dwell fixation or, in the case of reactive dyes, by alkaline fixation. The process according to the invention is particularly suitable for reactive and direct dyestuffs, of which metal complex direct dyestuffs, especially copper complex dyes, are preferred.

The process according to the invention is carried out upon a substrate on which the dyeing or printing process including any necessary fixation step, has been completed. The substrate may be dry, or may still be damp, provided that it is not so wet that it is incapable of further pick-up. The aftertreatment agent is applied to the substrate in aqueous solution in a long or short liquor exhaust process or by dipping, spraying, foam application, padding or other conventional application techniques. The preferred application method is by padding at room temperature.

In an exhaust process, when a long liquor to goods ratio (>10:1) is used the concentration of aftertreatment agent (including compound (E) if present) in the liquor is preferably 1–10 g/l, preferably 2–5 g/l, while for short liquor processes quantities of up to 20 or even 100 g/l may be necessary. (All weights are based on the dry weight of active components.) Application by exhaust is preferred for a precondensate of (A) and (B) without components (E) and (F).

For application by padding, the quantities in which the product according to the invention is applied to the substrate depend largely upon the depth of the dyeing which is to be fixed. For direct dyeings of 1/1 standard depth on cotton the quantities used are 30–200 g/l of the padding liquor when applied at a pick-up of 70–100% of the dry weight of the goods. Preferably the quantity is 70–140 g/l for cotton, in order to obtain a wash-resistant improvement in wet fastness together with adequate crease resistance, and 100–200 g/l for regenerated cellulose. For application to mixtures of cellulose fibers and synthetic fibres, the quantity to be applied is calculated on the basis of the cellulose content of the substrate.

The padding liquor may contain further auxiliaries such as stiffening agents, softening agents, agents to improve the rubbing or breaking strength, soil-release products, hydrophobic agents and others provided that these are capable of forming a stable aqueous solution when mixed with the product according to the invention.

When the aftertreatment agent contains N-methylol groups, as is the case for precondensates of (A) with (C) or (D), or any system in which (E) is present, then crosslinking is by a heat curing step in the presence of catalyst (F). For the system (A)+(B), epoxy or chlorohydrin groups are present, and crosslinking can occur at lower temperatures under alkaline conditions. For the first type of system, the substrate is subjected to a heat curing step such as is conventional for resin treatment based on compounds of type (E). The substrate may for example be dried at 70°–120° C. and finally crosslinked at a temperature of 130°–180° C. for 2 to 8 minutes, or alternatively simultaneously dried and crosslinked by heat treatment at 100°–200° C., preferably 140°–180° C. for 5 seconds to 8 minutes depending on the temperature. A preferred process involves heating the padded substrate to 170°–180° C. for 30 seconds to 1 minute.

For the second type of system, crosslinking may take place during exhaust application from an alkaline bath, for example at temperatures of room temperature to 100° C., preferably 40°–60° C.

Particularly suitable direct dyestuffs for use with the process of the invention are the following:

C.I. Direct Red 80, 83, 84, 92, 95, 207, 211, 218;
C.I. Direct Yellow 39, 50, 98, 106, 129;
C.I. Direct Violet 47, 66, 95;
C.I. Direct Blue 71, 77, 79, 80, 85, 90, 94, 98, 217, 251;
C.I. Direct Green 27, 31, 65, 67;
C.I. Direct Brown 103, 111, 113, 116, 220;
C.I. Direct Black 62, 117, 118;

and particularly suitable reactive dyes are

C.I. Reactive Violet 23,
C.I. Reactive Blue 23 and C.I. Reactive Blue 79.

Dyeings and printings with direct dyestuffs often show inadequate wash fastness. The dyestuff which is bound to the surface of the cellulose fibres is largely removed from the fibres by repeated washings, and bleeding of the dyestuff into the wash liquid can cause partial readsorption onto undyed cellulose material.

There have been many attempts to overcome these disadvantages, for example by complexing on the fibre with metal salts, formation of the dyestuff on the fibre, treatment of the dyestuff and/or the fibre with formaldehyde, impregnation with artificial resins and aftertreatment with cationic auxiliaries. The use of cationic after-treatment auxiliaries has proved particularly effective.

The disadvantage of all previously used methods is that although improved fastness is indeed attained, the results are only temporary. Even in the case of cationic after-treatment, the auxiliary is removed from the fibres by repeated washings, particularly under alkaline conditions and at high temperatures such as 50°–100° C. The loss of the cationic auxiliary means that the dyeing loses its improved wet fastness again.

It was hoped to solve the wet fastness problem by the use of reactive dyes, which form a chemical bond to the fibre. However, a disadvantage of the use of reactive dyes is that although the dyestuff which is chemically bound to the fibre has excellent wash fastness, the goods must be washed thoroughly after dyeing in order to remove residual unfixed dyestuff, which has poor wash fastness.

Treatment of dyed cellulose substrates according to the invention gives improved wet fastness properties, particularly fastness to washing, including washing under alkaline conditions at temperatures of 40°–90° C., particularly at 60° C. and above. For example, repeated 30 minute 60° C. washings with a wash liquor containing 5 g/l soap and 2 g/l soda at a goods to liquor ratio of 1:50 are readily withstood.

In the case of dyeings with reactive dyes, the wash fastness of the unfixed dye may be raised to approximately the same level as that of the fixed dye, thereby eliminating the need to remove the unfixed dye.

At the same time a resin finish is imparted to the cellulose fibres which gives reduced swelling in aqueous or alkaline media and hence more rapid drying, improved dimensional stability and higher crease resistance.

The following Examples, in which all parts and percentages are by weight and all temperatures in degrees Centigrade, illustrate the invention.

EXAMPLE 1

103 Parts diethylene triamine and 84 parts DCDA are heated to 110°. At this temperature an exothermic reaction begins and ammonia is evolved. The temperature is allowed to rise to 150°, then held at 160° for 6 hours to complete the reaction. Finally the reaction mixture is cooled to 90° and treated with 193 parts water. The resulting suspension is cooled to room temperature and the pH adjusted to 7.5 by addition of 59 parts 96% sulphuric acid, with cooling.

100 Parts of this solution are further diluted with 425 parts water and 15.5 parts epichlorohydrin are gradually added while stirring at room temperature. Finally the reaction mixture is warmed to 50° and stirred at this temperature for 1 hour. The solution is cooled to room temperature and neutralized with 1 part per volume of 30% caustic soda. A clear light yellow solution is obtained which may be used as an aftertreatment agent for direct dyeings on cotton.

EXAMPLES 2-7

Example 1 is repeated using quantities of reagents as set out in Table 1 (parts by weight):

TABLE 1

| Example No. | Dicyandiamide (DCDA) | Diethylene-triamine | Epichlorohydrin |
|---|---|---|---|
| 2 | 105 | 103 | 50 |
| 3 | 147 | 103 | 50 |
| 4 | 84 | 129 | 58 |
| 5 | 84 | 180 | 80 |
| 6 | 147 | 103 | 120 |
| 7 | 42 | 103 | 13 |

The resulting products may also be used for fixation of direct dyeings.

EXAMPLE 8

103 Parts diethylenetriamine, 79.8 parts DCDA and 9.7 parts dimethyl terephthalic acid ester are warmed to 110° and then slowly heated to 160°. In 3 hours 2.6 parts methanol and 28.9 parts ammonia are evolved. When reaction is complete the mixture is cooled to 90° and 121.6 parts 30% hydrochloric acid and 8.2 parts water are added. A white suspension is obtained which is cooled to room temperature. 65.9 Parts of this suspension are diluted with 197.7 parts water and 17.3 parts epichlorohydrin are added dropwise at 25°-30°. The mixture is warmed to 65°-70° and stirred for 3 hours. The resulting solution has a pH of 5.2 and is neutralized to pH 7 with 4.5 parts 30% caustic soda.

EXAMPLE 9

189 Parts tetraethylenepentamine are reacted with 84 parts DCDA at 150° for 5 hours. When no further ammonia is evolved a light yellow condensation product is obtained which solidifies on cooling and is ground to a powder. 25 Parts of this powdered condensation product are dissolved in 200 parts water and adjusted to pH 9 with 35% hydrochloric acid, with cooling. 8 Parts epichlorohydrin are slowly added at room temperature and the mixture is stirred for 3 hours at 70°. A clear yellow solution is obtained on cooling.

EXAMPLE 10

51.5 Parts diethylenetriamine are reacted for 6 hours at 160° with 90 parts guanidine carbonate until no further gas is evolved. An orange-beige product is obtained which is ground to a powder at room temperature. Reaction with 7.5 parts epichlorohydrin as described in Example 9 gives a clear yellow solution.

EXAMPLE 11

175.5 Parts 2-aminoethyl-3-aminopropylamine are reacted with 84 parts DCDA for 6 hours at 120°. The resulting condensation product is diluted with 227 parts water and 50 parts of the resulting suspension are neutralized with 11.5 parts 96% sulphuric acid and finally reacted with 10 parts epichlorohydrin according to Example 1.

EXAMPLE 12

120 Parts ethylenediamine and 84 parts DCDA are condensed for 6 hours at 125°. The resulting condensation product is diluted with 170 parts water and 50 parts of the resulting suspension are neutralized with 14.8 parts 96% sulphuric acid and finally reacted with 8 parts epichlorohydrin according to Example 1.

EXAMPLE 13

Application by Exhaust

An exhaust dyeing on cotton with the dyestuff C.I. Direct Black 117 (1/1 standard depth) is rinsed with water. The dyed goods are then treated for 1 hour at 40°-50° in a liquor containing 2 ml/l of 36° Bé caustic soda and 2 g/l (based on dry weight) of the after-treatment agent of Example 1, at a liquor-to-goods ratio of 20:1. After final rinsing with cold water and drying, the resulting dyeing has good wash fastness.

EXAMPLE 14

Application by padding

A rinsed, dried cotton fabric dyed in an exhaust bath with the dyestuff C.I. Direct Violet 66 (1/1 standard depth) is padded with a solution containing 40 g/l (based on dry weight) of the aftertreatment agent of Example 1 and 5 g/l soda, and squeezed out to approx. 80% pickup. The fabric is then dried on a tension frame by hot air at 150°, 4 minutes and finally rinsed with water. The resulting dyeing has good wash fastness.

EXAMPLE 15

Application by padding together with components E and F

A 1/1 standard depth dyeing on cotton of C.I. Direct Blue 90 is padded with a solution containing, per liter, 100 g of the aftertreatment agent of Example 1, 50 g of dimethyloldihydroxyethyleneurea, and 7.5 g magnesium chloride hexahydrate, and squeezed out to approx. 80% pickup. The fabric is then shock dried on a tension frame at a temperature of 175°-180°, such that the condensation time of the dried fabric at this temperature is about 30-45 seconds. The treated dyeing has a high wash fastness which is retained even after repeated 60° washes. At the same time a clear improvement in crease resistance is obtained, together with a reduced swellability of the cellulose fibres.

The aftertreatment agents of Examples 2-12 may be applied in the same manner as described in Examples 13-15, also with good results.

EXAMPLE 16

103 Parts diethylenetriamine and 84 parts DCDA are reacted as described in Example 1. The reaction product is not treated with water and acid, but is allowed to solidify on cooling. The resulting solid is then pulverized.

156 Parts of this powder are suspended in 400 parts by volume of water and the mixture warmed to 80°-90°; the powder gradually dissolves, to give a solution having a pH value of about 11. After cooling to 50°, 343 parts of a 35% aqueous formaldehyde solution are added dropwise. The reaction mixture is stirred for a further 2 hours at 50° then cooled to room temperature and neutralized with hydrochloric acid, to give 930 parts of a clear yellow solution containing about 30% dry weight of a precondensate of diethylene-triamine/DCDA with formaldehyde, which after addition of magnesium chloride can be used as an aftertreatment agent for direct dyeings on cotton.

EXAMPLE 17

Example 16 is repeated, except that before addition of formaldehyde, the pH of the solution of the amine/DCDA condensate is adjusted to pH 8 by the dropwise addition of concentrated sulphuric acid. A precondensate is obtained which after addition of magnesium chloride gives an aftertreatment agent giving excellent wash fastness properties to direct dyeings on cotton.

EXAMPLES 18, 19

Example 17 is repeated except that the pH is adjusted to pH 6 and pH 4, respectively, before addition of formaldehyde.

EXAMPLES 20, 21

103 Parts diethylene triamine is reacted with 105 parts DCDA under the conditions of Example 1. The reaction product is cooled and pulverized to a yellow-beige powder (170 parts).

Two lots of 90 parts of this powder are reacted, one with 227 parts 35% formaldehyde solution, the other with 340 parts, as described in Example 17. The resulting precondensates are finally diluted to a concentration of 10% active material.

EXAMPLES 22-33

Samples of cotton fabric are exhaust dyed at 1/1 standard depth with the dyestuffs shown in Table 2, rinsed and dried. The dyed samples are padded at 80% pickup with a solution containing x g/l of the precondensate of Example 17, 50 g/l dimethyloldihydroxyethyleneurea and 15 g/l $MgCl_2.6H_2O$, and adjusted to pH 4 with acetic acid. The padded substrates are shock dried on a tension frame at 180°, the condensation time of the dried fabric being about 30-45 seconds. All the fixed dyeings had good wash fastness properties.

TABLE 2

| Example No. | Precondensate x g/l (based on dry weight) | Dyestuff |
|---|---|---|
| 22 | 30 | C.I. Direct Green 68 |
| 23 | 30 | C.I. Direct Blue 251 |
| 24 | 30 | C.I. Direct Blue 77 |
| 25 | 30 | C.I. Direct Black 118 |
| 26 | 50 | C.I. Direct Red 207 |
| 27 | 30 | C.I. Direct Yellow 98 |
| 28 | 50 | C.I. Direct Green 68 |
| 29 | 50 | C.I. Direct Blue 251 |
| 30 | 50 | C.I. Direct Blue 77 |
| 31 | 50 | C.I. Direct Black 117 |
| 32 | 70 | C.I. Direct Red 207 |
| 33 | 50 | C.I. Direct Yellow 98 |

EXAMPLE 34

A 1/1 standard depth dyeing on cotton using the reaction dye C.I. Reactive Violet 23 is produced by standard methods, without final washing. The dyeing is rinsed briefly with cold water and dried, then padded at 80% pickup with a solution containing 70 g/l of the precondensate of Example 17 (based on dry weight) and 15 g/l $MgCl_2.6H_2O$. The fabric is then dried to a residual moisture content of 2-4% and cured for 60 seconds at 180°.

The resulting dyeing has good wash fastness properties, even though the conventional washing at the boil after reactive dyeing has been deliberately omitted.

EXAMPLE 35

19.4 Parts ammonium chloride are suspended in 19 parts water and treated with 32 parts DCDA. The mixture is warmed to 70° and 15.2 parts 30% hydrochloric acid are added dropwise. The reaction mixture is now warmed to 110° and stirred at this temperature for 45 minutes. A clear solution is obtained at first, which then becomes cloudy. The mixture is then cooled to 60° and treated at this temperature with 56.5 parts dihydroxyethyleneurea.

The resulting suspension is stirred for 45 minutes at 60°, then 137.5 parts of 37% aqueous formaldehyde is added dropwise at the same temperature. A solution is again obtained, which is cooled to 30° and adjusted to pH 3-3.5 by addition of approx. 12 parts sodium acetate. Finally 33.4 parts $MgCl_2.6H_2O$ is added portionwise and the mixture is stirred at room temperature for 30 minutes to give 235 parts of a clear yellow solution which can be used as an aftertreatment agent for direct dyeings on cotton.

EXAMPLE 36

60 Parts of the condensation product of DCDA and triethylenetetramine in 1:1 mole ratio are suspended in 40 parts water, adjusted to pH 4 with 50 parts by volume of 35% hydrochloric acid and warmed to 70°. At this temperature, 66 parts dihydroxyethyleneurea are added portionwise and the mixture is stirred for one hour. Still at the same temperature, 92 parts 37% formaldehyde solution is added dropwise and the mixture stirred for a further hour. The product is cooled to room temperature and the pH adjusted to 3.0-3.5 by addition of approx. 9 parts sodium acetate. 30 Parts $MgCl_2.6H_2O$ are dissolved in the solution, to give 352 parts of a clear light brown solution which may be used as an aftertreatment agent for direct dyeings on cotton.

EXAMPLES 37, 38

Example 15 is repeated using the products of Examples 35 and 36 in place of that of Example 1. Good wash fastness properties are obtained.

What is claimed is:

1. A water-soluble precondensate selected from the group consisting of
   I. a product produced by reacting (A) with (B) in aqueous solution at an initial pH of 6 to 9,
   II. a product produced by reacting (A) with (B) and (E), and
   III. a product produced by reacting (A) with (C) and (E),
   wherein
   (A) is the product of reacting a mono- or polyfunctional primary or secondary amine with dyanamide, dicyandiamide, guanidine or biguanidine; with the proviso that up to 50 mole % of the cyanamide, dicyandiamide, guanidine or biguanide may be replaced with a dicarboxylic acid or a mono- or di-ester thereof, said product (A) containing reactive hydrogen atoms bound to nitrogen,
   (B) is an epihalohydrin or a precursor thereof,
   (C) is formaldehyde or a formaldehyde precursor, and
   (E) is an N-methylol derivative of a urea, melamine, guanamine, triazinone, urone, carbamate or acid amide.

2. A precondensate according to claim 1 wherein component (A) is the product of reacting cyanamide, dicyandiamide or guanidine with a polyamine of formula I

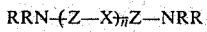    I in which each
R, independently, is hydrogen or a $C_{1-10}$alkyl group unsubstituted or monosubstituted with hydroxy, $C_{1-4}$alkoxy or cyano,
n is a number from 0 to 100
Z, or each Z independently when $n>0$, is $C_{2-4}$alkylene or hydroxyalkylene and
X, or each X independently when $n>1$, is —O—, —S— or —NR— where R is as defined above, provided that the amine of formula I contains at least one reactive —NH— or —NH$_2$ group.

3. A precondensate according to claim 2 wherein component (A) is the product of reacting dicyandiamide with a polyamine of formula I in which each R is hydrogen, n is 0 to 4, X is —NH— or —NCH$_3$— and Z, or each Z independently when $n>0$, is $C_{2-4}$alkylene.

4. A precondensate according to claim 1 formed by reacting components (A) and (B) in aqueous solution at an initial pH of 6 to 9.

5. A precondensate according to claim 4 wherein component (A) is the product of reacting cyanamide, dicyandiamide or guanidine with a polyamine of formula I

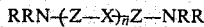    I in which each
R, independently, is hydrogen or a $C_{1-10}$alkyl group unsubstituted or monosubstituted with hydroxy, $C_{1-4}$alkoxy or cyano,
n is a number from 0 to 100
Z, or each Z independently when $n>0$, is $C_{2-4}$alkylene or hydroxyalkylene and
X, or each X independently when $n>1$, is —O—, —S— or —NR— where R is as defined above, provided that the amine of formula I contains at least one reactive —NH— or —NH$_2$ group.

6. A precondensate of components (A), (B) and (E), as defined in claim 1.

7. A precondensate of components (A), (C) and (E), defined as in claim 1.

8. A precondensate according to claim 6 wherein component (A) is the product of reacting cyanamide, dicyandiamide or guanidine with a polyamide of formula I

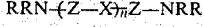    I in which each
R, independently, is hydrogen or a $C_{1-10}$alkyl group unsubstituted or monosubstituted with hydroxy, $C_{1-4}$alkoxy or cyano,
n is a number from 0 to 100
Z, or each Z independently when $n>0$, is $C_{2-4}$alkylene or hydroxyalkylene and
X, or each X independently when $n>1$, is —O—, —S— or —NR— where R is as defined above, provided that the amine of formula I contains at least one reactive —NH— or —NH$_2$ group.

9. A precondensate according to claim 7 wherein component (A) is the product of reacting cyanamide, dicyandiamide or guanidine with a polyamine of formula I

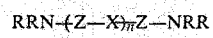    I in which each
R, independently, is hydrogen or a $C_{1-10}$alkyl group unsubstituted or monosubstituted with hydroxy, $C_{1-4}$alkoxy or cyano,
n is a number from 0 to 100
Z, or each Z independently when $n>0$, is $C_{2-4}$alkylene or hydroxyalkylene and
X, or each X independently when $n>1$, is —O—, —S— or —NR— where R is as defined above, provided that the amine of formula I contains at least one reactive —NH— or —NH$_2$ group.

10. A precondensate according to claim 5 wherein component (B) is epichlorohydrin or dichlorohydrin.

11. A precondensate according to claim 8 wherein component (B) is epichlorohydrin or dichlorohydrin.

12. A precondensate according to claim 10 wherein the mol ratio of (A):(B) is 1:0.3–2.

13. A precondensate according to claim 11 wherein the mol ratio of (A):(B) is 1:0.3–2.

14. A precondensate according to claim 8 wherein component (E) is selected from the group consisting of N,N'-dimethylol-4,5-dihydroxy-ethyleneurea, N,N'-dimethylol-4,5-dimethoxy-ethyleneurea, N,N'-dimethylol-4-methoxy-5,5-dimethyl-propyleneurea, N,N'-dimethylol carbamates and the methyl and ethyl ethers thereof.

15. A precondensate according to claim 11 wherein component (E) is selected from the group consisting of N,N'-dimethylol-4,5-dihydroxy-ethyleneurea, N,N'-dimethylol-4,5-dimethoxy-ethyleneurea, N,N'-dimethylol-4-methoxy-5,5-dimethyl-propyleneurea, N,N'-dimethylol carbamates and the methyl and ethyl ethers thereof.

16. A precondensate according to claim 13 wherein component (E) is selected from the group consisting of N,N'-dimethylol-4,5-dihydroxy-ethyleneurea, N,N'-dimethylol-4,5-dimethoxy-ethyleneurea, N,N'-dimethylol-4-methoxy-5,5-dimethyl-propyleneurea, N,N'-dimethylol carbamates and the methyl and ethyl ethers thereof.

17. A precondensate according to claim 16 wherein component (E) is employed in an amount of 50 to 200% by weight of (A)+(B).

18. A precondensate according to claim 9 wherein component (E) is selected from the group consisting of N,N'-dimethylol-4,5-dihydroxy-ethyleneurea, N,N'-dimethylol-4,5-dimethoxy-ethyleneurea, N,N'-dimethylol-4-methoxy-5,5-dimethyl-propyleneurea, N,N'-dimethylol carbamates and the methyl and ethyl ethers thereof.

19. A precondensate according to claim 18 wherein component (C) is formaldehyde or paraformaldehyde.

20. A precondensate according to claim 18 wherein the mole ratio of (A):formaldehyde is in the range 1:2 to 1:6, based on the number of moles of amine originally present and (E) is employed in an amount of 50 to 200% by weight of (A)+(C).

* * * * *